(12) United States Patent
McCune et al.

(10) Patent No.: US 9,695,710 B2
(45) Date of Patent: Jul. 4, 2017

(54) OIL TRANSFER BEARING

(71) Applicant: United Technologies Corporation, Hartford, CT (US)

(72) Inventors: Michael E. McCune, Colchester, CT (US); Marc J. Muldoon, Marlborough, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 53 days.

(21) Appl. No.: 14/831,963

(22) Filed: Aug. 21, 2015

(65) Prior Publication Data

US 2016/0069212 A1 Mar. 10, 2016

Related U.S. Application Data

(60) Provisional application No. 62/047,086, filed on Sep. 8, 2014.

(51) Int. Cl.
| | | |
|---|---|---|
| *F01D 25/18* | (2006.01) | |
| *F16C 33/10* | (2006.01) | |
| *F01D 25/16* | (2006.01) | |
| *F16H 57/04* | (2010.01) | |
| *F02C 7/06* | (2006.01) | |

(52) U.S. Cl.
CPC ............. *F01D 25/18* (2013.01); *F01D 25/16* (2013.01); *F16C 33/106* (2013.01); *F16C 33/1045* (2013.01); *F16H 57/043* (2013.01); *F16H 57/0479* (2013.01); *F16H 57/0482* (2013.01); *F02C 7/06* (2013.01); *F05D 2220/32* (2013.01); *F05D 2240/50* (2013.01); *F05D 2260/40311* (2013.01); *F05D 2260/98* (2013.01)

(58) Field of Classification Search
CPC ...... F01D 52/18; F01D 25/16; F16H 57/0479; F16H 57/0482; F16H 57/043; F16C 33/1045; F16C 33/106; F05D 2260/40311; F05D 2220/32; F05D 2240/50; F05D 2260/98; F02C 7/06
See application file for complete search history.

(56) References Cited

U.S. PATENT DOCUMENTS

| | | |
|---|---|---|
| 5,246,087 A | 9/1993 | Schipper |
| 5,472,383 A | 12/1995 | McKibbin |

(Continued)

FOREIGN PATENT DOCUMENTS

| | | | |
|---|---|---|---|
| CN | 201277153 Y | 7/2009 | |
| DE | WO 2012004067 A1 * | 1/2012 | .......... F16C 33/6659 |

(Continued)

OTHER PUBLICATIONS

English translation of WO2012004067; http://translationportal.epo.org; Dec. 16, 2016.*

(Continued)

*Primary Examiner* — Roger Pang
(74) *Attorney, Agent, or Firm* — Carlson, Gaskey & Olds, P.C.

(57) ABSTRACT

A transfer bearing assembly includes a transfer bearing shaft. An oil transfer bearing surrounds the transfer bearing shaft. A radially extending tube is attached to the transfer bearing shaft and is configured to engage a carrier on a speed reduction device.

17 Claims, 4 Drawing Sheets

(56) References Cited

U.S. PATENT DOCUMENTS

| | | | |
|---|---|---|---|
| 6,223,616 B1 | 5/2001 | Sheridan | |
| 6,758,598 B2 | 7/2004 | Beauvais et al. | |
| 7,223,197 B2 | 5/2007 | Poulin et al. | |
| 8,025,601 B2* | 9/2011 | Iwasaki | F16H 3/66 475/159 |
| 8,065,867 B2 | 11/2011 | McCutchan | |
| 8,276,275 B2 | 10/2012 | Sheridan et al. | |
| 8,425,361 B1* | 4/2013 | Beckner | F16H 57/0479 475/159 |
| 8,480,527 B2 | 7/2013 | Snyder et al. | |
| 8,484,942 B1 | 7/2013 | McCune et al. | |
| 8,672,801 B2 | 3/2014 | McCune et al. | |
| 8,756,908 B2 | 6/2014 | Sheridan et al. | |
| 9,416,866 B2* | 8/2016 | Konruff | F16H 57/0431 |
| 2007/0197339 A1* | 8/2007 | Ryymin | F16H 1/2863 475/331 |
| 2012/0108380 A1* | 5/2012 | Dinter | F16C 17/10 475/159 |
| 2012/0192570 A1 | 8/2012 | McCune et al. | |
| 2014/0087907 A1 | 3/2014 | Coffin et al. | |
| 2016/0091082 A1* | 3/2016 | Boland | F16H 57/0479 475/159 |
| 2016/0097330 A1* | 4/2016 | Venter | F01D 15/12 415/122.1 |
| 2016/0215871 A1* | 7/2016 | Brault | F16H 57/042 |

FOREIGN PATENT DOCUMENTS

| | | |
|---|---|---|
| EP | 2441923 A2 | 12/2011 |
| EP | 2518279 A2 | 10/2012 |
| WO | 2015033066 A1 | 3/2015 |

OTHER PUBLICATIONS

Extended European Search Report for European Application No. 15184136.8, mailed Feb. 29, 2016.

* cited by examiner

OIL TRANSFER BEARING

CROSS-REFERENCE TO RELATED APPLICATIONS

This application claims priority to U.S. Provisional Application No. 62/047,086, which was filed on Sep. 8, 2014 and is incorporated herein by reference.

BACKGROUND

Planetary gear trains are complex mechanisms that reduce, or occasionally increase, the rotational speed between two rotating shafts or rotors. The compactness of planetary gear trains makes them appealing for use in aircraft engines where space is at a premium.

The forces and torque transferred through a planetary gear train place stresses on the gear train components that may make them susceptible to breakage and wear. In practice, conditions may be less than ideal and place additional stresses on the gear components. For example the longitudinal axes of a planetary gear train's sun gear, planet carrier, and ring gear are ideally coaxial with the longitudinal axis of an external shaft that rotates the sun gear. Such perfect coaxial alignment, however, is rare due to numerous factors including imbalances in rotating hardware, manufacturing imperfections, and transient flexure of shafts and support frames due to aircraft maneuvers.

The resulting parallel and angular misalignments impose moments and forces on the gear teeth, the bearings which support the planet gears in their carrier, and the carrier itself. These imposed forces and moments may cause gear component wear and increase a likelihood that a component may break in service. Component breakage is undesirable in any application, but particularly so in an aircraft engine. Moreover, component wear necessitates inspections and part replacements which may render the engine and aircraft uneconomical to operate.

The risk of component breakage may be reduced by making the gear train components larger and therefore stronger. Increased size may also reduce wear by distributing the transmitted forces over correspondingly larger surfaces. However increased size offsets the compactness that makes planetary gear trains appealing for use in aircraft engines, and the corresponding weight increase is similarly undesirable. The use of high strength materials and wear resistant coatings can also be beneficial, but escalates the cost of the gear train and therefore does not diminish the desire to reduce wear.

Properly lubricating the components of the planetary gear trains is essential to increasing the life and reducing wear of the components. However, as the size of a fan section driven by the planetary gear train increases, the planetary gear train will rotate at a slower speed. When the planetary gear train rotates at slower speeds, conventional methods of lubricating the planetary gear train may not generate adequate forces to move the lubricant to all of the components that require lubrication. Therefore, there is a need to enhance lubrication of the components of the planetary gear train.

SUMMARY

In one exemplary embodiment, a transfer bearing assembly includes a transfer bearing shaft. An oil transfer bearing surrounds the transfer bearing shaft. A radially extending tube is attached to the transfer bearing shaft and is configured to engage a carrier on a speed reduction device.

In a further embodiment of the above, the oil transfer bearing includes a stationary outer bearing and a rotating inner bearing attached to the transfer bearing shaft.

In a further embodiment of any of the above, the stationary outer bearing includes at least one race aligned with at least one opening in the rotating inner bearing and is configured to transfer oil from the stationary bearing to the transfer bearing shaft through the rotating inner bearing.

In a further embodiment of any of the above, the transfer bearing shaft includes at least one axially extending passage in communication with one of the at least one opening in the rotating inner bearing.

In a further embodiment of any of the above, a radially inner end of the tube engages the transfer bearing shaft. A radially outer end of the tube engages a carrier.

In a further embodiment of any of the above, the tube is configured to move in a radial direction relative to the transfer bearing shaft.

In a further embodiment of any of the above, the transfer bearing shaft includes at least one radially extending opening that is in communication with the axially extending passage. The tube is located within the radially extending opening.

In another exemplary embodiment, a gas turbine engine section includes a planetary gear set that includes a rotating carrier. A transfer bearing assembly includes a transfer bearing shaft. An oil transfer bearing surrounds the transfer bearing shaft. A radially extending tube is attached to the transfer bearing shaft and is configured to engage a carrier on a speed reduction device.

In a further embodiment of the above, the oil transfer bearing includes a stationary outer bearing and a rotating inner bearing attached to the transfer bearing shaft.

In a further embodiment of any of the above, the stationary outer bearing includes at least one race aligned with at least one opening in the rotating inner bearing and is configured to transfer oil from the stationary bearing to the transfer bearing shaft through the rotating inner bearing.

In a further embodiment of any of the above, the transfer bearing shaft includes at least one axially extending passage that is in communication with one of the at least one opening in the rotating inner bearing.

In a further embodiment of any of the above, a radially inner end of the tube engages the transfer bearing shaft. A radially outer end of the tube engages the carrier.

In a further embodiment of any of the above, the transfer bearing shaft includes at least one radially extending opening that is in communication with the axially extending passage. The tube is located within the radially extending opening.

In a further embodiment of any of the above, the tube is configured to move in a radial direction relative to the transfer bearing shaft.

In a further embodiment of any of the above, the transfer bearing shaft is attached to the carrier with a flexible member.

In a further embodiment of any of the above, the transfer bearing shaft is attached to the carrier with a sliding fit pin connection.

In a further embodiment of any of the above, the transfer bearing shaft includes a carrier attachment flange that has a plurality of openings for receiving fasteners to attach the transfer bearing shaft to the carrier.

In another exemplary embodiment, a method of lubricating a component on a gas turbine engine includes directing a lubricant through an oil transfer bearing toward at least one axially extending passage in a transfer bearing shaft and directing the lubricant to a carrier from the axially extending passage through a tube capable of moving relative to the transfer bearing shaft in a radially direction.

In a further embodiment of any of the above the at least one axially extending passage is in communication with a radially extending passage. The tube is located within the radially extending passage.

In a further embodiment of any of the above, a radially inner end of the tube engages the transfer bearing shaft and a radially outer end of the tube engages the carrier.

DETAILED DESCRIPTION

Figure 1:
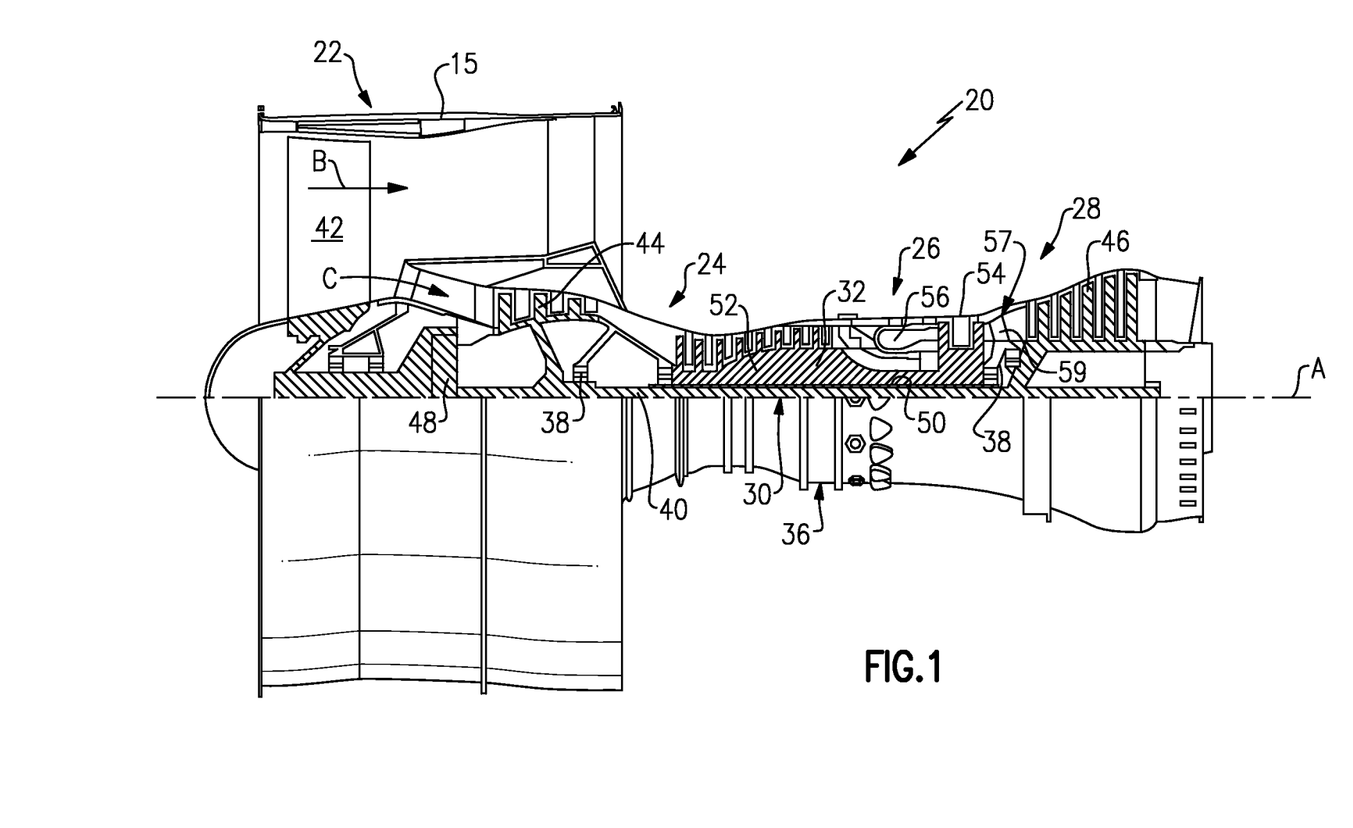
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be a speed reduction device, such as an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
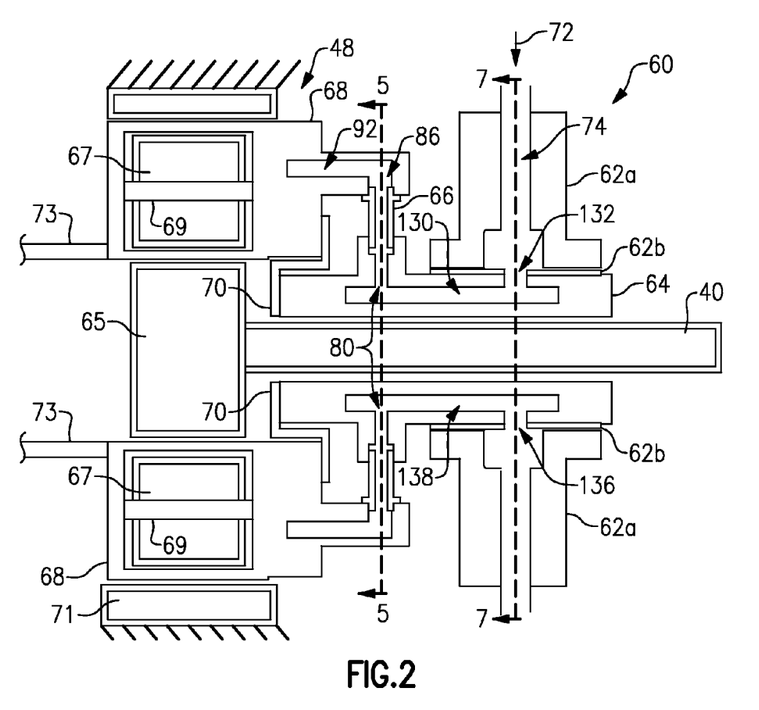
FIG. 2 illustrates a schematic sectional view of an example oil transfer bearing in the gas turbine engine of FIG. 1.

FIG. 2 illustrates an example oil transfer bearing assembly 60 for the gas turbine engine 20. The oil transfer bearing assembly 60 includes a stationary bearing 62a that is fixed from rotation and a rotating bearing 62b that is attached to and rotates with a transfer bearing shaft 64. The transfer bearing shaft 64 is spaced radially outward from the inner shaft 40 and rotates at a slower rotational speed than the inner shaft 40. The stationary bearing 62a may also ride directly on transfer bearing shaft 64.

A lubrication tube 66 fluidly couples the transfer bearing shaft 64 to a carrier 68 of the geared architecture 48. The carrier 68 is attached to the transfer bearing shaft 64 through a flexible member 70 so that the carrier 68 and the transfer bearing shaft 64 rotate at the same rotational speed.

In the illustrated example, the geared architecture 48 is a planetary gear system and includes the inner shaft 40 attached to a sun gear 65. The sun gear 65 engages multiple planet gears 67 located on bearings 69 within the carrier 68. A ring gear 71 is fixed from rotation, engages the multiple planet gears 67, and surrounds the carrier 68. The fan section 42 is attached to and driven by the carrier 68 through a fan drive shaft 73.

As lubricant enters a radially outer end of the stationary bearing 62a and moves in the radially inward direction 72, the lubricant passes through a radially inward extending passage 74 in the stationary bearing 62a. The radially inward extending passage 74 in the stationary bearing 62a is in fluid communication with a first, second, and third opening 132, 136, 140 (FIG. 6) in the rotating bearing 62b to communicate the lubricant into a corresponding axially extending first, second, and, third oil conduit 130, 134, 138, respectively, in the transfer bearing shaft 64.

Radially outward extending passages 80 are located on an opposite end of the first, second, and third oil conduits 130, 134, 138 from the first, second, and third openings 132, 136, 140, respectively. In the illustrated example, the radially outward extending passages 80 include a first diameter D1 spaced radially inward from a second diameter D2. The second diameter D2 is greater than the first diameter D1. The diameter D2 is large enough to allow the tube 66 to move in the radial direction relative to the transfer bearing shaft 64 within the radially extending passage 80.

Figure 3:
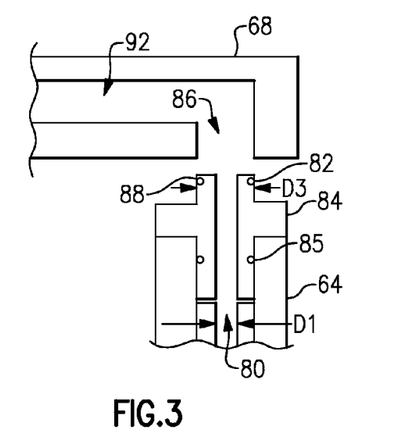
FIG. 3 illustrates a lubrication tube in a retracted position.
Figure 4:
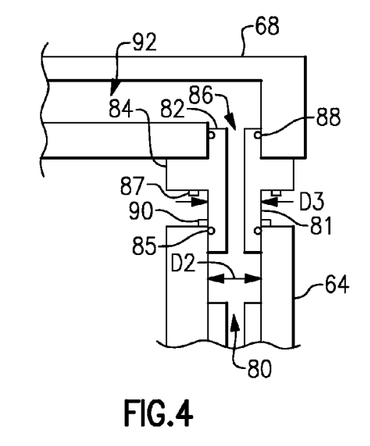
FIG. 4 illustrates the lubrication tube in an extended position.

As shown in FIGS. 3 and 4, the tube 66 includes a radially inner sleeve 81 and a radially outer sleeve 82 separated by a flange 84. The radially inner sleeve 81 mates with the radially extending passage 80 and includes a diameter D3 that is slightly smaller than the diameter D2 to allow the radially inner sleeve 81 to move within the radially extending passage 80.

A first O-ring 85 surrounds an outer diameter of the radially inner sleeve 81 to create a seal between the radially inner sleeve 81 and the radially extending passage 80. A second O-ring 88 surrounds an outer diameter of the radially outer sleeve 82 to create a seal between the radially outer sleeve 82 and a carrier opening 86 in the carrier 68.

The tube 66 can be secured relative to the carrier 68 with fasteners 87 extending through the flange 84 into the carrier 68 and/or with a retention ring 90. The retention ring 90 surrounds the outer diameter of the radially inner sleeve 81 and is in abutting contact with a radially outer side of the transfer bearing shaft 64.

Once the lubricant reaches the carrier 68, the lubricant travels through a passage 92 in the carrier 68 to lubricate the appropriate parts of the geared architecture 48, such as the sun gear 65, the planet gears 67, and the bearings 69. Additionally, the lubricant can travel through the carrier 68 and lubricate the bearing systems 38 in the gas turbine engine 20.

FIGS. 3 and 4 illustrate the tube 66 in a retracted position and an installed position relative to the carrier 68, respectively. When the radially extending passage 80 in the transfer bearing shaft 64 is axially and circumferentially aligned with the carrier opening 86 in the carrier 68, the tube 66 is moved radially outward until the flange 84 abuts a radially inner side of the carrier 68. When the flange 84 and the carrier 68 are in abutting contact, the fasteners 87 and/or the retention ring 90 secure the tube 66 relative to the carrier 68 while still allowing the carrier 68 to grow in the radially direction faster than the transfer bearing shaft 64.

By allowing for relative movement between the tube 66 and the transfer bearing shaft 64, the carrier 68 is allowed to expand at a different radial rate than the transfer bearing shaft 64. The relative movement between the carrier 68 and the transfer bearing shaft 64 reduces the amount of material needed in the forward carrier 68 wall to match radial growth of the aft carrier 68 wall. The material can be reduced in the carrier 68 because the aft carrier 68 is no longer restrained from radial growth by the transfer bearing shaft 64.

Figure 5:
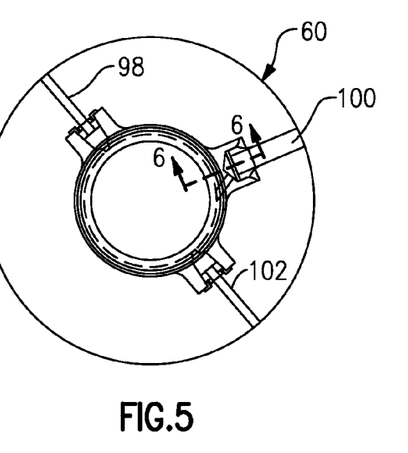
FIG. 5 illustrates a sectional view taken along line 5-5 of FIG. 2.

As shown in FIG. 5, the oil transfer bearing assembly 60 includes a plurality of inputs to provide lubricant to those portions of the geared architecture 48 that require lubrication during operation. For example, oil from first tube 98 is intended to lubricate at least one of the bearing systems 38, oil from a second tube 100 is intended to lubricate the bearings 69 in the geared architecture, and oil from a third tube 102 is intended to lubricate the sun gear 65, planet gears 67, and a ring gear 71 of the geared architecture 48. Though three inputs are shown herein, other numbers of lubricant inputs are contemplated herein.

Figure 6:
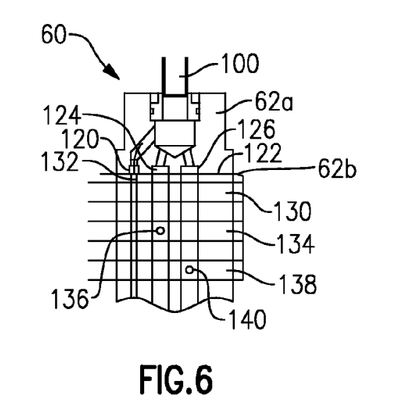
FIG. 6 illustrates a sectional view taken along line 6-6 of FIG. 5.

FIG. 6 illustrates a sectional view of the oil transfer bearing assembly 60. In the illustrated example, the oil transfer bearing assembly 60 includes a first race 120, a second race 124, and a third race 126 each having a rectangular shape that extend around an interior surface 122 of the stationary bearing 62a.

The first oil conduit 130 extends axially through the transfer bearing shaft 64 and is in communication with the first race 120 via the first opening 132. The second oil conduit 134 extends axially through the transfer bearing shaft 64 and is in communication with the second race 124 via the second opening 136. The third oil conduit 138 extends axially through the transfer bearing shaft 64 and is in communication with the third race 126 via the third opening 140.

As the transfer bearing shaft 64 and the rotating bearing 62b rotate within the stationary bearing 62a, the first, second, and third openings 132, 136, 140 are constantly in alignment with the first, second, and third races 120, 124, 126, respectively. This allows oil to flow across a rotating gap between the stationary bearing 62a and the rotating bearing 62b through the first, second, and third openings 132, 136, 140 to the first, second, and third oil conduits 130, 134, 138, respectively, to provide lubrication to the necessary areas in the gas turbine engine 20.

Figure 7:
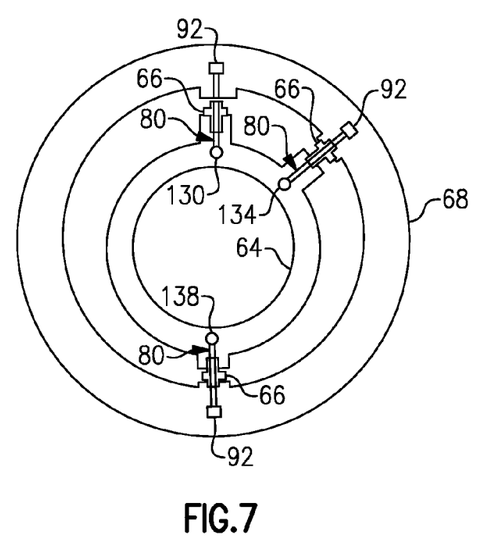
FIG. 7 illustrates a sectional view taken along line 7-7 of FIG. 2.

FIG. 7 illustrates a cross section view taken along line 7-7 of FIG. 2 showing the first, second, and third oil conduits 130, 134, and 138 extending through the transfer bearing shaft 64. The tube 66 in communication with the first oil conduit 130 is in a radially retracted position spaced from the carrier 68 and the tubes 66 in communication with the second and third oil conduits 134 and 138 are in a radially extended position so that the second and third oil conduits 134 and 138 are in fluid communication with the carrier 68.

Figure 8:
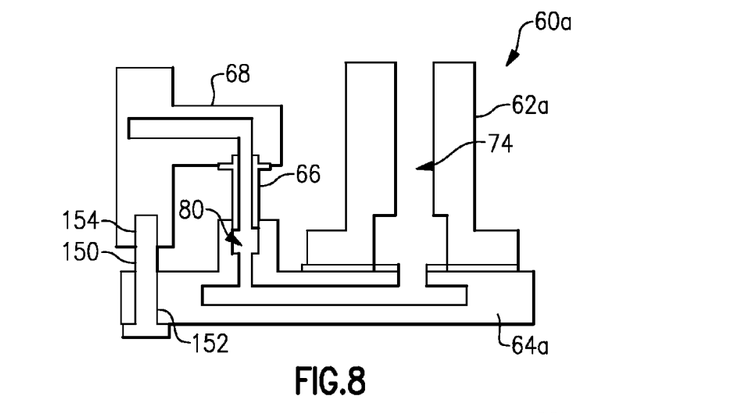
FIG. 8 illustrates another example oil transfer bearing.

FIG. 8 illustrates another example oil transfer bearing assembly 60a. The oil transfer bearing assembly 60a is similar to the oil transfer bearing assembly 60 except where described below or shown in the Figures. A transfer bearing shaft 64a is attached to a carrier 68a by a sliding fit pin 150. The sliding fit pin 150 extends through an opening 152 in the transfer bearing shaft 64a and into an opening 154 in the carrier 68a. The sliding fit pin 150 can include threads to mate with the opening 154 in the carrier 68a to retain the sliding fit pin 150 to the carrier 68a. Alternatively, the sliding fit pin 150 could be press fit within the opening 154.

Figure 9:
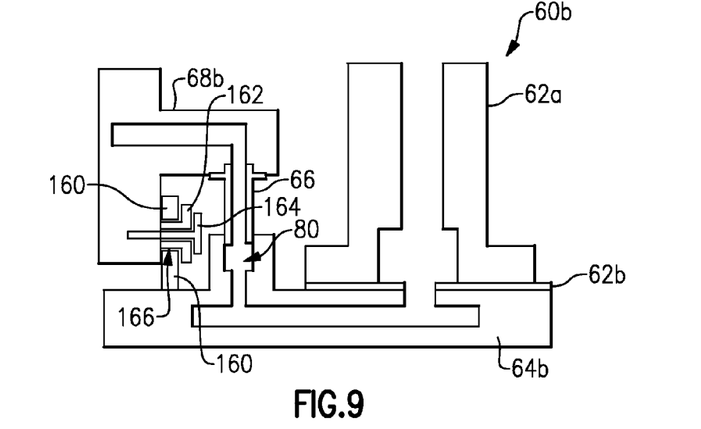
FIG. 9 illustrates yet another example oil transfer bearing.

FIG. 9 illustrates another example oil transfer bearing assembly 60b. The oil transfer bearing assembly 60b is similar to the oil transfer bearing assembly 60 except where described below or shown in the Figures. A transfer bearing shaft 64b includes a flange 160 extending radially outward adjacent a carrier 68b. The flange 160 includes an opening 166 for accepting a sleeve 162 and a retainer 164. The opening 166 is large enough to allow for relative movement between the sleeve 162 and the flange 160 for alignment between the carrier 68b and the transfer bearing shaft 64b during operation. The sleeve 162 may also include a flange 168 on an opposite side of the flange 160 from the carrier 68b. The flange 168 allows the opening 166 to be larger than the sleeve 162 and the retainer 164 and still allow the retainer 164 to prevent axial movement between the carrier 68b and the transfer bearing shaft 64b.

Figure 10:
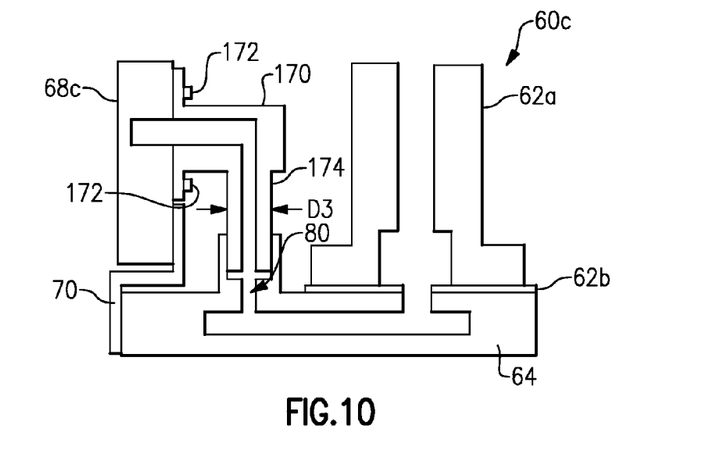
FIG. 10 illustrates a further example oil transfer bearing.

FIG. 10 illustrates another example oil transfer bearing assembly 60c. The oil transfer bearing assembly 60c is similar to the oil transfer bearing assembly 60 except were described below or shown in the drawings. A periscope 170 is fastened to a carrier 68c in place of the tube 66 and fastened to the carrier 68c with fasteners 172. The periscope 170 includes a passage 92 and a protrusion 174 having an outer dimension D3 for mating with the radially extending passage 80 in the transfer bearing shaft 64. A distal end of the protrusion 174 includes an opening 86c and the distal end is spaced from a radially inner end of the opening to allow for relative movement between the transfer bearing shaft 64 and the carrier 68c.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A transfer bearing assembly including:
    a transfer bearing shaft;
    an oil transfer bearing surrounding the transfer bearing shaft, wherein the oil transfer bearing includes a stationary outer bearing and a rotating inner bearing attached to the transfer bearing shaft; and
    a radially extending tube attached to the transfer bearing shaft configured to engage a carrier on a speed reduction device.

2. The assembly of claim 1, wherein the stationary outer bearing includes at least one race aligned with at least one opening in the rotating inner bearing configured to transfer oil from the stationary bearing to the transfer bearing shaft through the rotating inner bearing.

3. The assembly of claim 2, wherein the transfer bearing shaft includes at least one axially extending passage in communication with one of the at least one opening in the rotating inner bearing.

4. The assembly of claim 3, wherein a radially inner end of the tube engages the transfer bearing shaft and a radially outer end of the tube engages a carrier.

5. The assembly of claim 4, wherein the tube is configured to move in a radial direction relative to the transfer bearing shaft.

6. The assembly of claim 4, wherein the transfer bearing shaft includes at least one radially extending opening in communication with the axially extending passage and the tube is located within the radially extending opening.

7. A gas turbine engine section including:
    a planetary gear set including a rotating carrier; and
    a transfer bearing assembly including:
        a transfer bearing shaft;
        an oil transfer bearing surrounding the transfer bearing shaft, wherein the oil transfer bearing includes a stationary outer bearing and a rotating inner bearing attached to the transfer bearing shaft; and
        a radially extending tube attached to the transfer bearing shaft configured to engage the rotating carrier on a speed reduction device.

8. The gas turbine engine section of claim 7, wherein the stationary outer bearing includes at least one race aligned with at least one opening in the rotating inner bearing configured to transfer oil from the stationary bearing to the transfer bearing shaft through the rotating inner bearing.

9. The gas turbine engine section of claim 8, wherein the transfer bearing shaft includes at least one axially extending passage in communication with one of the at least one opening in the rotating inner bearing.

10. The gas turbine engine section of claim 9, wherein a radially inner end of the tube engages the transfer bearing shaft and a radially outer end of the tube engages the carrier.

11. The gas turbine engine section of claim 9, wherein the transfer bearing shaft includes at least one radially extending opening in communication with the axially extending passage and the tube is located within the radially extending opening.

12. The gas turbine engine section of claim 7, wherein the tube is configured to move in a radial direction relative to the transfer bearing shaft.

13. The gas turbine engine section of claim 7, wherein the transfer bearing shaft is attached to the carrier with a flexible member.

14. The gas turbine engine section of claim 7, wherein the transfer bearing shaft is attached to the carrier with a sliding fit pin connection.

15. The gas turbine engine section of claim 7, wherein the transfer bearing shaft includes a carrier attachment flange having a plurality of openings for receiving fasteners to attach the transfer bearing shaft to the carrier.

16. A method of lubricating a component on a gas turbine engine comprising:
    directing a lubricant through an oil transfer bearing toward at least one axially extending passage in a transfer bearing shaft, wherein the at least one axially extending passage is in communication with a radially extending passage and a tube is located within the radially extending passage; and directing the lubricant to a carrier from the axially extending passage through a tube capable of moving relative to the transfer bearing shaft in a radially direction.

17. The method of claim 16, wherein a radially inner end of the tube engages the transfer bearing shaft and a radially outer end of the tube engages the carrier.

\* \* \* \* \*